US006984830B2

(12) United States Patent
Burgio

(10) Patent No.: US 6,984,830 B2
(45) Date of Patent: Jan. 10, 2006

(54) APPARATUS FOR LIMITED-HEAT CURING OF PHOTOSENSITIVE COATINGS AND INKS

(76) Inventor: Joseph T. Burgio, 2400 S. Forge Rd., Palmyra, PA (US) 17078

(*) Notice: Subject to any disclaimer, the term of this patent is extended or adjusted under 35 U.S.C. 154(b) by 0 days.

(21) Appl. No.: 10/170,837

(22) Filed: Jun. 12, 2002

(65) Prior Publication Data

US 2002/0190225 A1 Dec. 19, 2002

Related U.S. Application Data

(60) Provisional application No. 60/297,811, filed on Jun. 13, 2001.

(51) Int. Cl.
*B01J 19/12* (2006.01)

(52) U.S. Cl. ................................ 250/492.1; 250/504 R

(58) Field of Classification Search ............ 250/492.1; 34/4; 240/47; 128/396
See application file for complete search history.

(56) References Cited

U.S. PATENT DOCUMENTS

| | | | | |
|---|---|---|---|---|
| 2,080,120 | A | | 5/1937 | Everett ........................ 240/47 |
| 2,301,675 | A | | 11/1942 | Arndt ............................ 95/73 |
| 2,380,682 | A | | 7/1945 | Boerstler ..................... 88/107 |
| 3,624,380 | A | | 11/1971 | Davis ............................ 240/2 |
| 3,733,709 | A | | 5/1973 | Bassemir et al. ................ 34/4 |
| 3,819,929 | A | | 6/1974 | Newman ................. 240/41.37 |
| 4,000,407 | A | | 12/1976 | Keller et al. .................. 240/47 |
| 4,222,177 | A | | 9/1980 | Mason ............................ 34/4 |
| 4,298,806 | A | | 11/1981 | Herold ................... 250/504 H |
| 4,309,616 | A | | 1/1982 | Wolff ......................... 250/494 |
| 4,444,190 | A | | 4/1984 | Mutzhas ..................... 128/396 |
| 4,563,589 | A | | 1/1986 | Scheffer ................. 250/504 R |
| 4,704,667 | A | | 11/1987 | Ploeger ...................... 362/318 |
| 4,836,102 | A | * | 6/1989 | Cicci ........................... 101/41 |
| 4,864,145 | A | | 9/1989 | Burgio, Jr. ............... 250/492.1 |
| 4,890,208 | A | | 12/1989 | Izenour ...................... 362/294 |
| 4,983,852 | A | | 1/1991 | Burgio, Jr. .............. 250/504 R |
| 5,048,198 | A | | 9/1991 | Burgio, Jr. ....................... 34/4 |
| 5,172,973 | A | | 12/1992 | Spada ......................... 362/74 |
| 5,249,076 | A | * | 9/1993 | Fujiwara et al. ............ 359/350 |
| 5,282,121 | A | * | 1/1994 | Bornhorst et al. .......... 362/294 |
| 5,321,595 | A | | 6/1994 | Jacobi et al. ............... 362/373 |

(Continued)

FOREIGN PATENT DOCUMENTS

| | | |
|---|---|---|
| GB | 312105 | 5/1929 |
| GB | 2260395 | 4/1993 |

*Primary Examiner*—John R. Lee
*Assistant Examiner*—Phillip A. Johnston
(74) *Attorney, Agent, or Firm*—Drinker Biddle & Reath LLP

(57) ABSTRACT

An apparatus for curing photosensitive inks and coatings includes a lamp generating radiant energy containing ultraviolet radiation. The apparatus further includes a filter assembly receiving at least a portion of the radiant energy from the lamp. The filter assembly includes a body defining an open interior and panes located on opposite sides of the body to enclose the interior and form a chamber. An inlet and an outlet communicate with the chamber to provide for circulation of a fluid through the chamber. The filter assembly further includes a solid filter positioned within the chamber. The solid filter and the panes are transmissive to the ultraviolet radiation of the radiant energy generated by the lamp. The apparatus may include a shutter system having a plurality of opaque particles suspended in a liquid coolant for circulation of the particles through the chamber.

17 Claims, 7 Drawing Sheets

U.S. PATENT DOCUMENTS

| | | | | |
|---|---|---|---|---|
| 5,343,629 | A | 9/1994 | Rae | 34/278 |
| 5,647,662 | A | 7/1997 | Ziegler et al. | 362/294 |
| 5,722,761 | A | 3/1998 | Knight | 362/96 |
| 5,727,472 | A | 3/1998 | Burgio | 101/487 |
| 5,832,833 | A | 11/1998 | Burgio | 101/424.1 |
| 5,949,959 | A | 9/1999 | Lovett et al. | 392/408 |
| 6,064,798 | A | 5/2000 | Lovett et al. | 392/408 |
| 6,088,931 | A | 7/2000 | Aylor et al. | 34/267 |
| 6,241,921 | B1 * | 6/2001 | Jacobson | 264/1.36 |
| 6,605,669 | B2 * | 8/2003 | Awokola et al. | 525/123 |

* cited by examiner

APPARATUS FOR LIMITED-HEAT CURING OF PHOTOSENSITIVE COATINGS AND INKS

CROSS REFERENCE TO RELATED APPLICATION

The present application claims the benefit of U.S. Provisional Application Ser. No. 60/297,811, filed Jun. 13, 2001, which is incorporated herein by reference.

FIELD OF THE INVENTION

The invention relates to curing of inks and coatings. More particularly, the invention relates to curing of photosensitive inks and coating using ultraviolet radiation.

BACKGROUND OF THE INVENTION

Photosensitive inks and coatings are formulated to react to radiant energy in the ultraviolet range (250 to 400 nm) for accelerated curing. The inks and coatings are applied, in a printing press for example, to moving webs or sheets. The webs or sheets are then directed through a beam of radiant energy generated by a curing device to subject the inks and coatings to ultraviolet rays. Curing devices typically include a high intensity source of radiant energy to generate sufficient amounts of ultraviolet radiation for rapid curing of the photosensitive inks and/or coatings applied to the moving substrate. Curing devices typically include a reflector positioned adjacent the lamp to redirect a portion of the radiant energy to form a focused beam.

The radiant energy generated by the high intensity light source, however, includes heat generating rays of infrared radiation and visible light rays in addition to the desired ultraviolet rays. If left untreated, the amount of heat contained in the infrared and visible light rays could damage many substrates, such as heat shrinkable labeling used for food and beverage containers, for example. U.S. Pat. No. 4,864,145 discloses a curing device having a high intensity, medium pressure, mercury vapor lamp and a liquid cooled reflector. The beam is directed through a liquid filled filtering chamber to remove infrared radiation from the beam. The beam is then redirected, through a filtering pane, by an angled reflector. U.S. Pat. No. 5,321,595 discloses a curing device having liquid filled tubes for filtering infrared radiation from a radiant energy beam.

It is sometimes necessary to stop a printing press to make adjustments, for example. Prolonged exposure to the radiant energy from a curing device during a stoppage could be damaging to many substrates. U.S. Pat. No. 5,722,761, discloses a curing device having reflector members that can be pivoted to impinge on a portion of the radiant energy beam thereby preventing passage of the beam portion to the substrate.

SUMMARY OF THE INVENTION

The present invention provides an apparatus for curing photosensitive material such as inks and coating, for example. The apparatus includes a lamp generating radiant energy containing ultraviolet radiation. The apparatus further includes a filter body having an open interior positioned adjacent the lamp to receive at least a portion of the radiant energy generated by the lamp. The apparatus further includes first and second panes transmissive to ultraviolet radiation on opposite sides of the filter body to enclose the open interior forming a chamber. The apparatus includes an inlet and an outlet communicating with the chamber that are connectable to a fluid circulation system for circulating a coolant through the chamber. The apparatus also further includes a solid filter transmissive to ultraviolet radiation positioned in the chamber between the first and second panes. The solid filter is capable of removing substantially all radiation above approximately 700 nm from the radiant energy received by the solid filter such that the radiant energy is cooled to provide for limited-heat curing of a photosensitive material.

The invention also provides a printing apparatus. The printing apparatus includes at least one print stand capable of applying photosensitive inks or coatings to a substrate. The printing apparatus further includes a lamp adjacent the print stand generating radiant energy containing ultraviolet radiation for curing the photosensitive inks or coatings applied to the substrate. The printing apparatus also includes a filter assembly positioned between the lamp and the substrate to receive radiant energy directed toward the substrate from the lamp. The filter assembly includes a body defining an open interior and opposite panes enclosing the interior of the body to form a chamber. The filter assembly further includes an inlet and an outlet for circulating a fluid through the chamber. The panes and the solid filter are each transmissive to ultraviolet radiation.

The invention further provides a system for filtering a beam of radiant energy. The system includes a body defining an open interior and a pair of panes secured to opposite sides of the body to define an enclosed chamber. Each of the panes is transmissive to at least a portion of the radiant energy beam. The system includes an inlet and an outlet communicating with the chamber for connection of the chamber to a circulation system for circulating a liquid coolant through the chamber. The system includes a shutter system in which a plurality of opaque particles are suspended in the liquid coolant such that the opaque particles can be circulated through the chamber with the liquid coolant. The shutter system also has a trap system for selectively removing the opaque particles from the circulating liquid coolant.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE PREFERRED EMBODIMENTS

Figure 1:
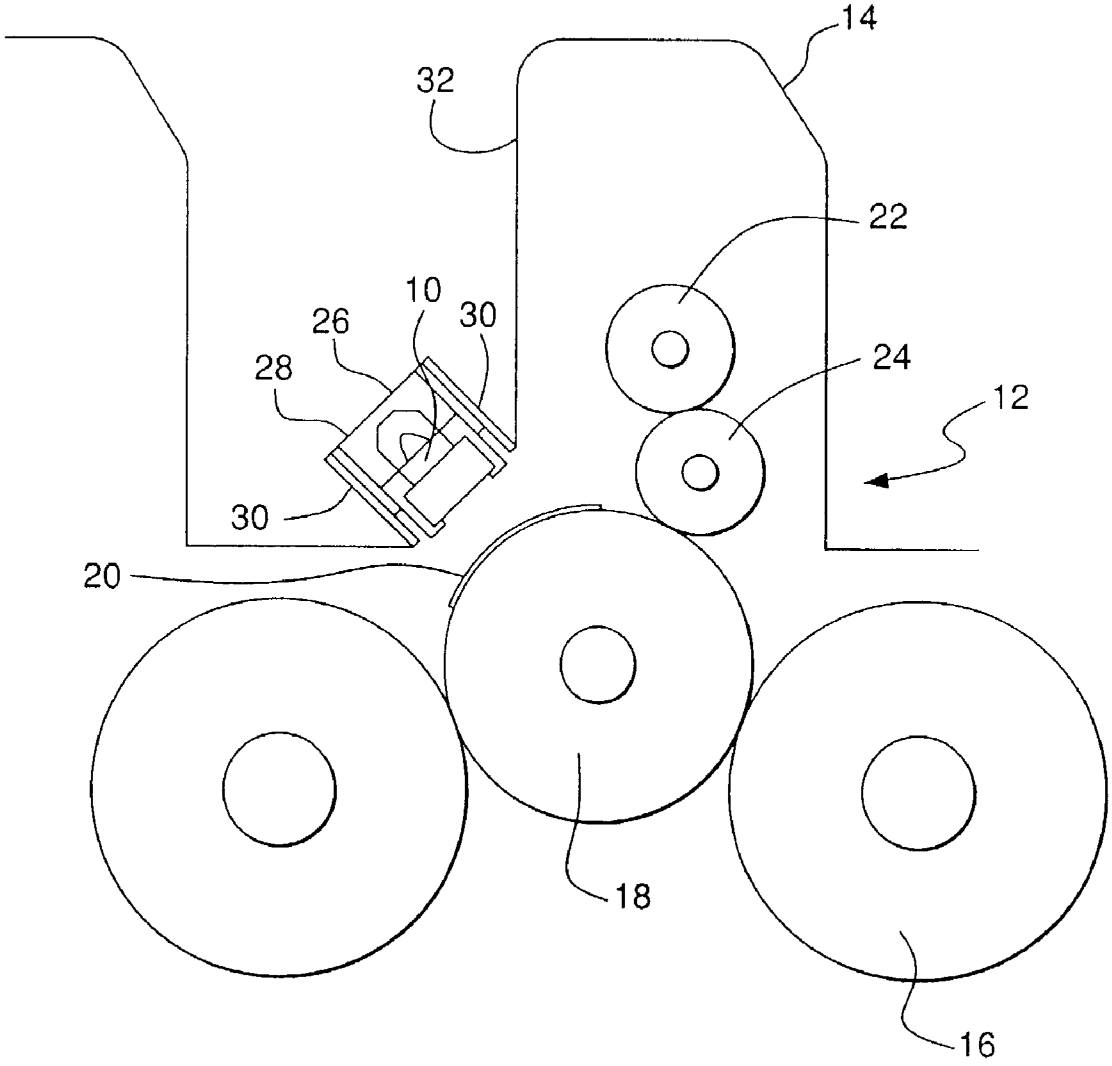
FIG. 1 is a schematic side view of a portion of a sheet fed printing press according to the present invention having an apparatus for curing a photosensitive material.

Referring to the drawings, where like numerals identify like elements, there is shown an apparatus 10 for curing photosensitive inks and coatings used in web fed and sheet fed printing presses, for example. Referring to the schematic illustration of FIG. 1, the apparatus 10 is shown installed on a sheet fed printing press 12 adjacent to a print stand 14. The print stand 14 includes a transfer cylinder 16 and an impression cylinder 18 in a lower portion of the stand. The transfer and impression cylinders 16, 18 of print stand 14 contact the transfer and impression cylinders of adjacent print stands to form a series of interconnected cylinders for directing sheets 20 through the press 12. The print stand 14 further includes a plate cylinder 22 and a blanket cylinder 24 in an upper portion of the print stand 14. The plate cylinder 22 and blanket cylinder 24 supply a photosensitive ink to the sheet 20 that is applied to the sheet 20 as it is directed between the blanket cylinder 24 and the impression cylinder 18 of print stand 14.

The apparatus 10 is shown in the schematic illustration of FIG. 1 supported by an interdeck housing 26 having perpendicular top and side plate portions 28, 30. The apparatus 10 may be mounted within the interdeck housing 26 in any suitable manner such as by bracketing (not shown). The interdeck housing 26 is connected to a main press housing 32 such that the apparatus 10 is enclosed within the press 12 by the main housing 32 and the interdeck housing 26. The support of the apparatus 10 in this manner positions the apparatus 10 adjacent the impression cylinder 18 of print stand 14 in the angled orientation shown to direct ultraviolet radiation to a sheet 20. The connection between the interdeck housing 26 and the main housing 32 preferably provides for removal of the apparatus 10 from the enclosed condition shown in FIG. 1 for maintenance of the apparatus 10. The interdeck housing 26 could, for example, be pivotably secured to the main housing 32, in the manner described in U.S. Pat. No. 5,832,833, to provide for access to the apparatus 10. Alternatively, the interdeck housing 26 could be completely removable from the main housing 32 using a tab and slot connection, for example.

Figure 2:
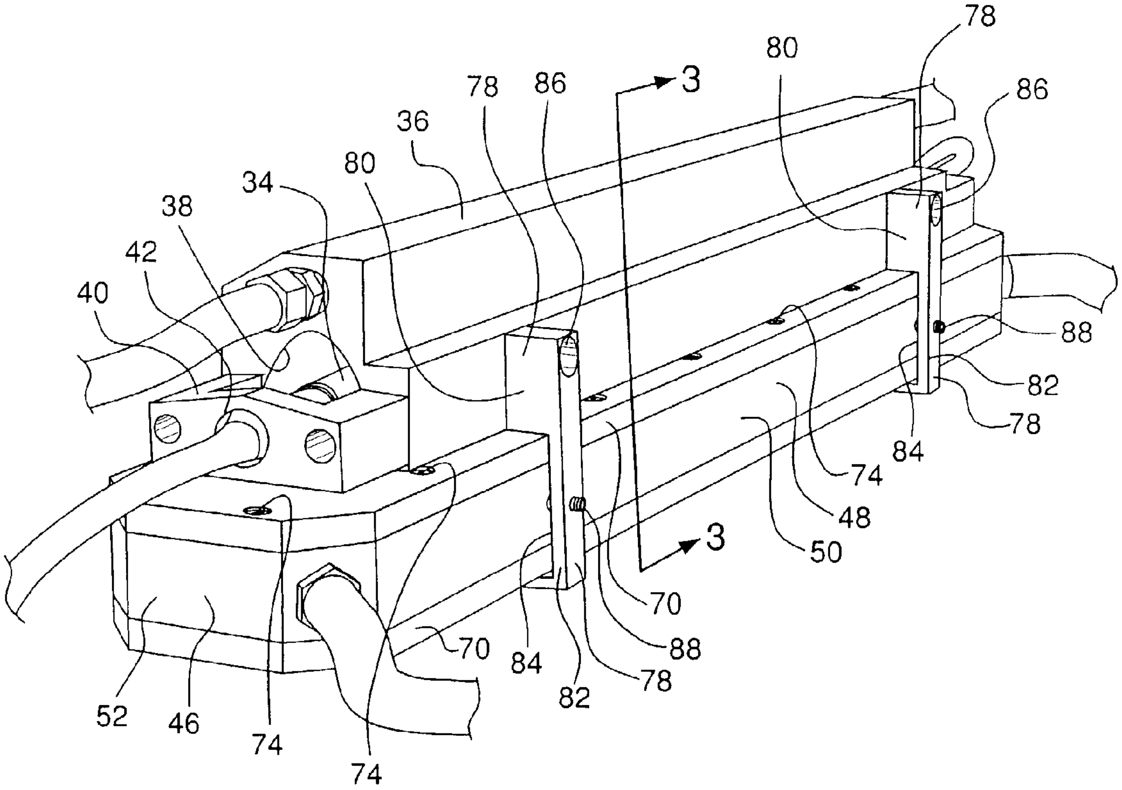
FIG. 2 is a perspective view of a curing apparatus according to the present invention.

Referring to FIG. 2, the apparatus 10 is shown removed from the printing press 12. The apparatus includes a high intensity lamp 34 providing the source of radiant energy containing ultraviolet radiation for curing of photosensitive material such as the photosensitive ink applied to sheet 20 in printing press 12. The lamp 34 is preferably a medium pressure, mercury vapor lamp, per se known in the art. Such lamps have power requirements ranging from approximately 5,000 to 25,000 watts. An example of such a high intensity lamp is the air-cooled medium pressure, mercury vapor lamp, described in U.S. Pat. No. 4,864,145 the description of which is incorporated herein by reference. Such lamps produce radiant energy that includes ultraviolet and infrared radiation as well as visible light.

The apparatus 10 further includes a reflector 36 having a parabolic curved surface 38. The apparatus 10 includes lamp support collars 40 secured to opposite sides of the reflector 36. Each of the support collars 40 includes an opening 42 for receipt of an end fitting of the lamp 34 such that the lamp 34 extends parallel to the reflector 36 and spaced from a center line of the parabolic surface 38. The reflector 36 defines a hollow interior 44 for circulation of water, or a water-based coolant, through the interior 44 to cool the reflector 36. Liquid cooled reflectors are known, as described in U.S. Pat. No. 4,864,145, the description of which is incorporated herein by reference. The reflector 36, positioned in this manner with respect to the lamp 34, functions to redirect a portion of the radiant energy emitted by lamp 34. The portion redirected by the reflector 36 is joined with a directly emitted portion to form a focused beam of radiant energy.

Figure 3:
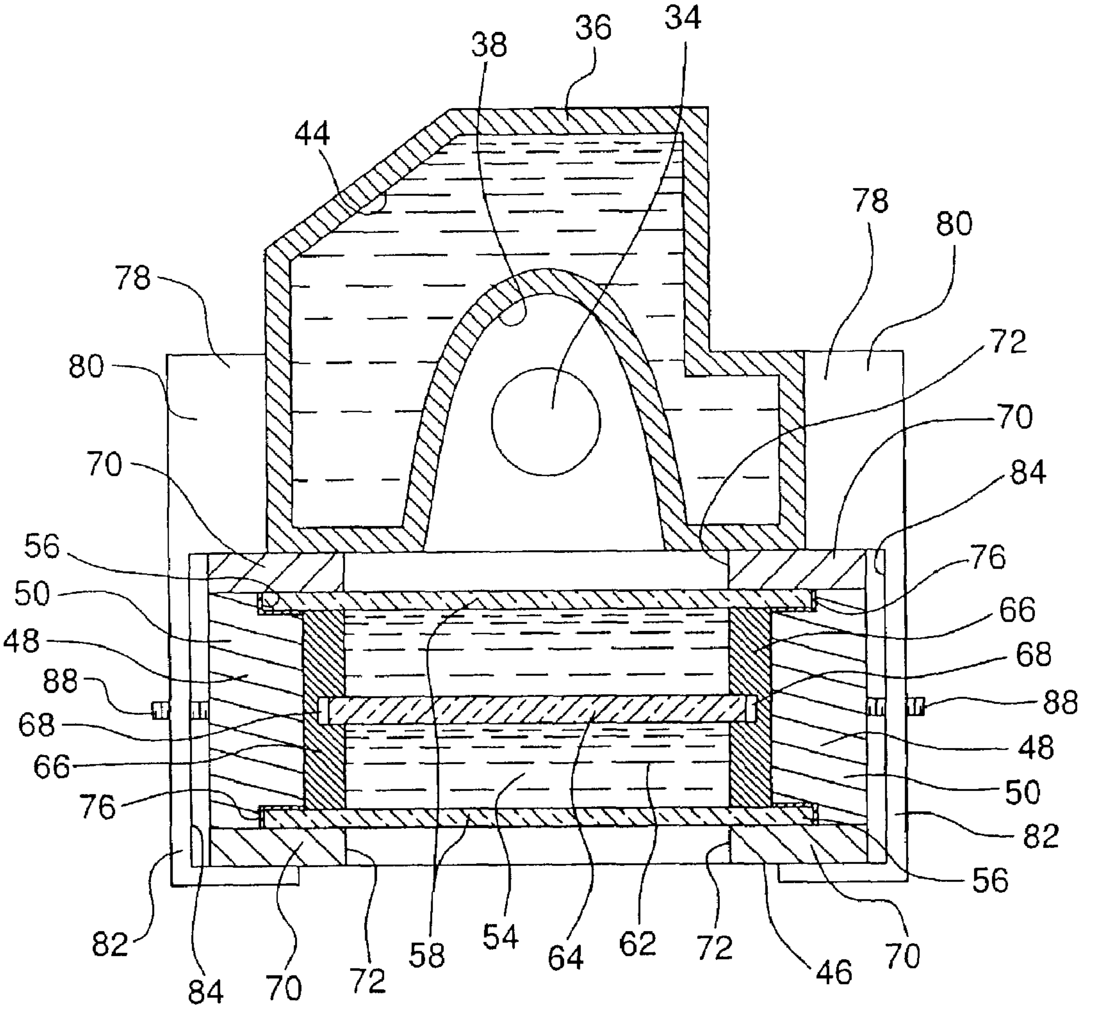
FIG. 3 is a sectional view taken along the lines 3—3 in FIG. 2.

The apparatus 10 further includes a filter assembly 46, shown in greater detail in FIG. 3. The filter assembly 46 is secured to the reflector 36, in the manner described in greater detail below, such that the focused beam of radiant energy will be directed from the reflector 36 through the filter assembly 46. The filter assembly 46 is transmissive to ultraviolet radiation in the focused beam but filters out undesirable radiation that generates heat in the focused beam.

The filter assembly 46 includes a body 48 having side walls 50 and end walls 52 forming an open interior. Recesses 56 formed in the body 48 receive panes 58, transmissive to ultraviolet radiation, to enclose the open interior of body 48 to form a chamber 54. The panes 58 are preferably made from material that is resistant to elevated temperatures. The filter assembly 46 includes fittings 60 in each of the end walls 52 of the body 48. The fittings 60 provide for connection between the filter assembly 46 and a circulation system for directing a liquid coolant 62, such as water or a mixture of water and glycerol, through the chamber 54. As shown in FIG. 1, the apparatus 10 is mounted to the interdeck housing 26 such that the apparatus 10 is oriented at an angle with respect to the press 12. The angled orientation of the apparatus facilitates targeting of a sheet 20 carried by impression cylinder 18 by the filtered beam of the apparatus 10. The apparatus 10 is preferably mounted such that the fittings 60, located on the same side of the body 48, will be upwardly located with respect to the chamber 54. This construction and orientation of the filter assembly 46 is less likely to create air pockets within the chamber 54 of filter assembly 46 than would an orientation in which the fittings 60 are downwardly located with respect to the chamber 54.

The apparatus 10 further includes a solid filter 64 positioned within the chamber 54 of the filter assembly 46. The solid filter 64 is received in notches 68 formed in support plates 66 that are located within the chamber 54 adjacent the side walls 50 of body 48. The filter assembly 46 further includes a retainer plate 70 at each of opposite sides of the body 48 to secure the panes 58 to the body 48 with the solid filter 64 and the associated support plates 66 positioned within the chamber 54 between the panes 58. The retainer plates 70, each having a central aperture 72, are secured to the body 48 of filter assembly 46 by threaded fasteners 74. A gasket 76 is positioned between the recesses 56 of the body 48 and the panes 58 to seal the chamber 54 to provide for circulation of the liquid coolant 62. The enclosed chamber 54 of the filter assembly 46 provides for surrounding of the solid filter 64 by the liquid coolant 62 circulated through the chamber 54. The construction of the filter assembly 46 facilitates access to the chamber 54 for maintenance or for removal and replacement of the solid filter 64.

The solid filter 64 removes unwanted heat producing radiation, such as infrared radiation, from the focused beam while permitting the desired ultraviolet radiation to pass through the filter. Such materials, sometimes referred to as "band-pass" or "UV-pass" filter materials, are per se known. The solid filter 64 is preferably capable of filtering substantially all radiation above approximately 700 nm from the focused beam.

The addition of a glycerol to the liquid coolant 62 circulated through the chamber 54 will also provide for some filtering of the heat-producing radiation from the energy beam. The panes 58, providing an ultraviolet transmissive enclosure for the chamber 54, may also provide an additional filtering effect for reducing heat producing radiation from radiant energy beam. The placement of the solid filter 64 within the circulating liquid coolant 62 in chamber 54 will remove heat from the solid filter 64 caused by the filtered radiant energy above 700 nm.

The apparatus 10 includes connectors 78 securing the reflector 36 to the filter assembly 46. Each connector 78 includes opposite first and second end portions 80, 82. The first end portion 80 includes a notch 84 in which the filter assembly 46 is received. The connectors 78 are secured to the reflector 36 by fasteners (not visible) received in holes 86 in the second end portions 82 of the connectors. Threaded members 88, received by the notched first end portions 80 of the connectors 78, positions the filter assembly between opposite connectors 78 as shown in FIG. 3. Connection of the filter assembly 46 to the reflector 36 could be made by other means. For example, the apparatus 10 could include angled bracket secured to the sides and top, respectively, of the reflector 36 and the filter assembly 46.

As described previously, the lamp 34 and reflector 36 of apparatus 10 produces a beam of radiant energy containing the desired ultraviolet radiation as well as infrared radiation and visible light rays. Passage of the beam through the filter assembly 46 removes heat-producing rays of infrared radiation and visible light. The resulting cooled beam that exits from the filter assembly 46 consists almost entirely of ultraviolet radiation as well as radiation in the purple-blue portion of the visible spectrum. The provision of such a cooled beam of radiant energy is highly desirable for printing on heat sensitive substrates such as heat shrink polymers used for container labeling. The cooled beam is also desirable where multiple curing cycles may be required for one substrate such as for multiple-color applications.

The combination of the solid filter 64 within the liquid cooled chamber 54 of filter assembly 46 provides for a highly compact device for forming the cooled beam containing ultraviolet radiation. Such space saving efficiency is highly desirable and leads to greater applicability of the apparatus in devices, such as the new generation of digital printing presses, in which compactness is required.

Some printing presses are adapted to cut power to the lamp during slowdowns or stoppages to limit heating of the printing press components and to then re-strike the lamp when the substrate is sufficiently moving again. While this is theoretically possible, in practice, the voltage required to strike a "hot" arc, before re-condensing is in the order of 5 to 10 times the operating voltage. For safety and reliability this is not a practical solution.

In extended exposure of a press cylinder to the cooled beam of the present invention, the temperature of the cylinder was increased only 5 degrees Fahrenheit after 40 minutes of exposure. Limited heating of the press cylinder is desirable as heat absorbed by the cylinder could be transferred to the substrate. The apparatus 10 is highly desirable for printing on very thin substrates as well as for printing on heat sensitive material such as heat-shrinkable materials now commonly used for labeling on containers. The cooled beam provided by the apparatus 10 also facilitates multi-colored printing applications where the substrate may be subjected to multiple exposures to the radiant energy beam following the application of each color.

Figure 4:
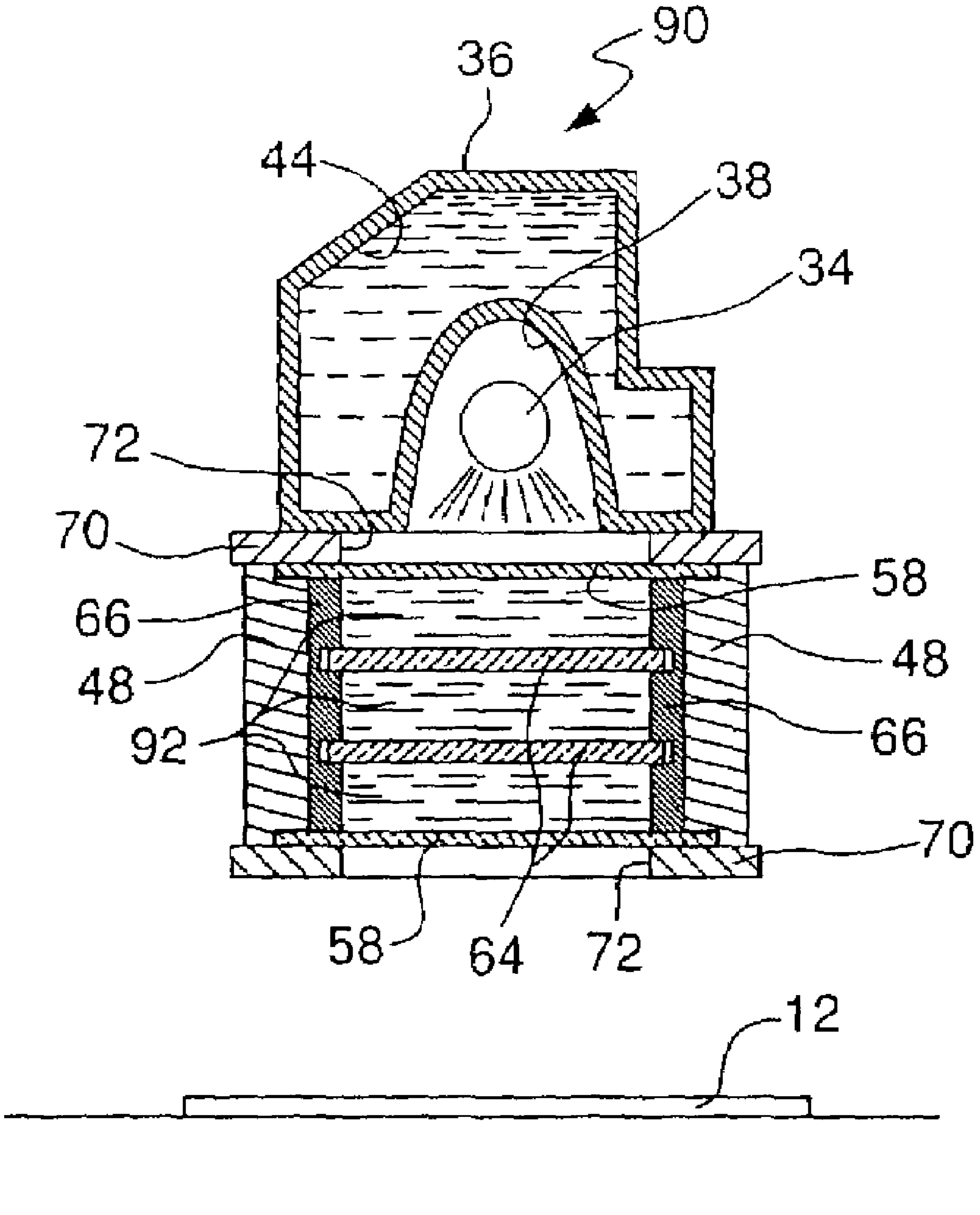
FIG. 4 is a sectional view of a curing apparatus according to the present invention having multiple solid filters.

Referring to FIG. 4, there is illustrated an alternative apparatus 90 according to the present invention having a pair of spaced solid filters 64 positioned within the body 48 of the filter assembly 46. The spaced filters 64 could be adapted to define separate compartments 92 in which liquid or gaseous materials having varying opacity could be circulated to provide adjustability in the radiant energy transmission characteristics. It should be added, that variation in the transmission properties of the filter assembly are also possible by varying the relative thickness of the compartments as required by the suitable materials.

There are certain uv coatings for which a controlled amount of heating is actually desirable for optimal curing. A controlled amount of heating is also desirable for curing uv coatings on closed substrates such as polycarbonate, polyester, and styrene where heating during the reaction can increase the adhesion characteristics of the materials to the substrate. This is especially true when these materials have a coating applied before the ink to enhance the dyne level of the substrate. Such a "pre-coating" bonds better with the top ink or coating when heated above ambient temperatures. Variations in the photo-polymer chemistry can sometimes reduce the amount of heat needed, but this is not always possible or practicable. Therefore, the addition of a controlled amount of heat by the curing device would be desirable in such applications.

Figure 5:
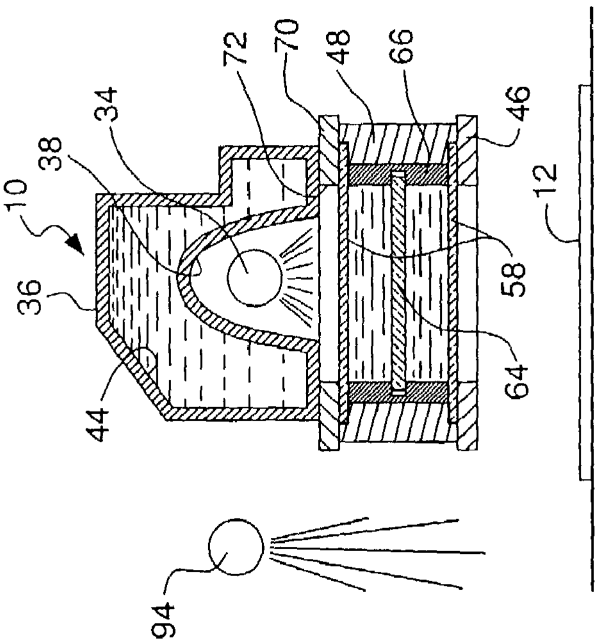

Referring to FIG. 5, a heating device 94 such as an IR emitter is located upstream of apparatus 10 to provide the controlled heating of the substrate prior to exposure to the radiant energy beam. Alternatively, as shown in FIG. 6, a curing apparatus 96 includes filter assembly 46 and additionally incorporates an IR heating device 98 upstream of a lamp 100 and reflector 102 to apply a dose of the infrared energy immediately upstream of the cooled ultraviolet beam.

By use of the proper IR emitting device, very finely controlled temperature parameters can be achieved. One way to achieve this is to include a short wave IR device which has a low thermal inertia, and the ability to infinitely vary the amount of heat generated by control means known to those skilled in the art. The IR emitter is tuned to produce the proper amount of heating effect and because of the low thermal inertia, whenever the machinery or substrate is stationary, the device can be immediately switched off. It is also possible that suitable control means using temperature-sensing means in a closed loop system could provide for proportional control of UV and/or heating device parameters for constant substrate temperature. Such control would be highly desirable during variable speed operation, for example.

Figure 6:
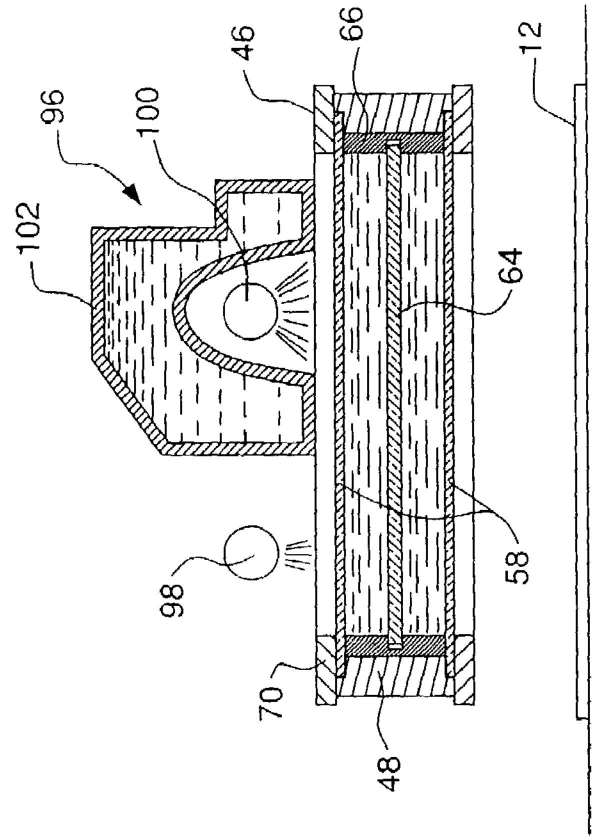
FIGS. 5 and 6 are sectional views each showing a curing apparatus according to the present invention having an infrared generating device upstream of an ultraviolet generating device.

The present invention is not limited to the embodiments shown in FIGS. 5 and 6. The curing apparatus could include multiple heating devices prior to the general location of the UV curing device to achieve a predetermined temperature of the substrate for optimum curing, without damage to the substrate or deleterious effects on the equipment and environment close to the UV device.

Figure 7:
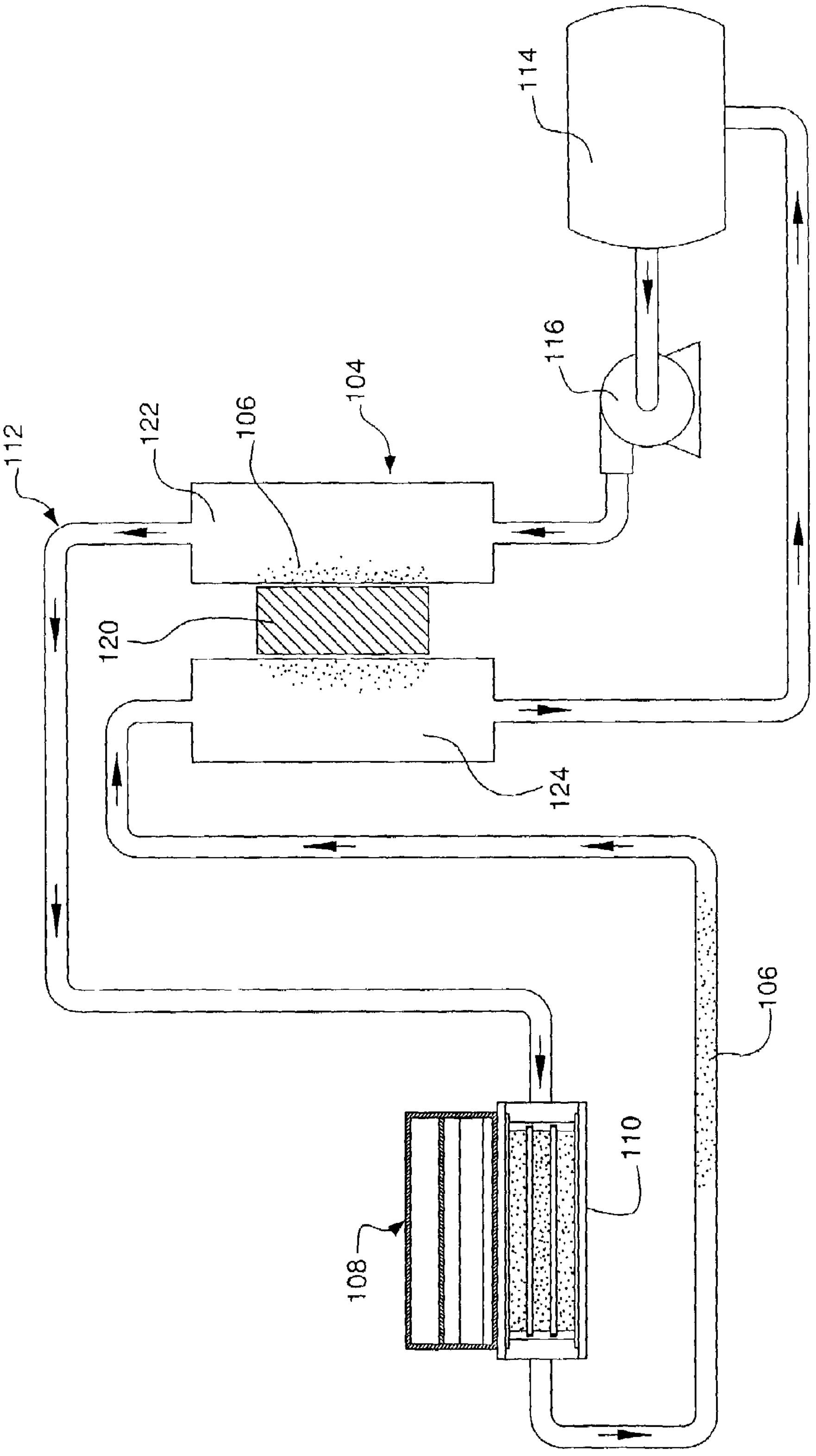
FIG. 7 is a schematic view of a filtering system according to the present invention.

Referring to FIG. 7, there is illustrated a system for filtering a beam of radiant energy according to the present invention. The filtering system includes a shutter system 104 that provides for optional additional filtering during slowdowns or stoppages of a substrate, for example, to limit excessive exposure of the substrate to the radiant energy beam. The shutter system 104 includes a plurality of opaque particles 106 that are inert to a circulating liquid coolant and capable of suspension in the liquid coolant. The suspension of the particles 106 in the liquid coolant provides for circulation of the particles to a filter assembly 110 of a curing apparatus 108 to provide for an additional filtering of the beam to that otherwise provided by the filter assembly

110 absent the suspended particles 106. 62 and capable of suspension utilizes opaque particles 106 that are inert to the liquid coolant. The opaque particles 106 are preferably made from a magnetically attractable material, such as a ferromagnetic material, to provide for their removal from the circulating coolant, in the manner to be described, when the additional filtering by shutter system 104 is not needed.

The shutter system 104 is incorporated into a circulation system 112 for the liquid coolant that includes a supply tank 114 and a pump 116. The shutter system 104 further includes a magnetic trap 118 for removing the opaque particles 106 from the circulating liquid coolant. The trap 118 includes an electromagnet 120 for generating a magnetic field having a sufficient strength to attract and hold the opaque particles 106 thereby preventing their circulation to the filter assembly 110. The trap system 118 includes inlet and outlet vessels 122, 124 adjacent the electromagnet 120 and connected to the circulating system 112 upstream and downstream, respectively, of the filter assembly 110 of apparatus 108. The inclusion of separate inlet and outlet vessels 122, 124 facilitates more rapid removal of the opaque particles 106 from the circulating coolant.

Additional shuttering could also be provided by including separate compartments 126 within the filter assembly 110 and circulating a more opaque liquid or gas in one of the chambers. A solid filter device capable of being selectively transmissive or opaque to the radiant energy, such as in response to electric current, could also provide the additional filtering.

Figure 7A:
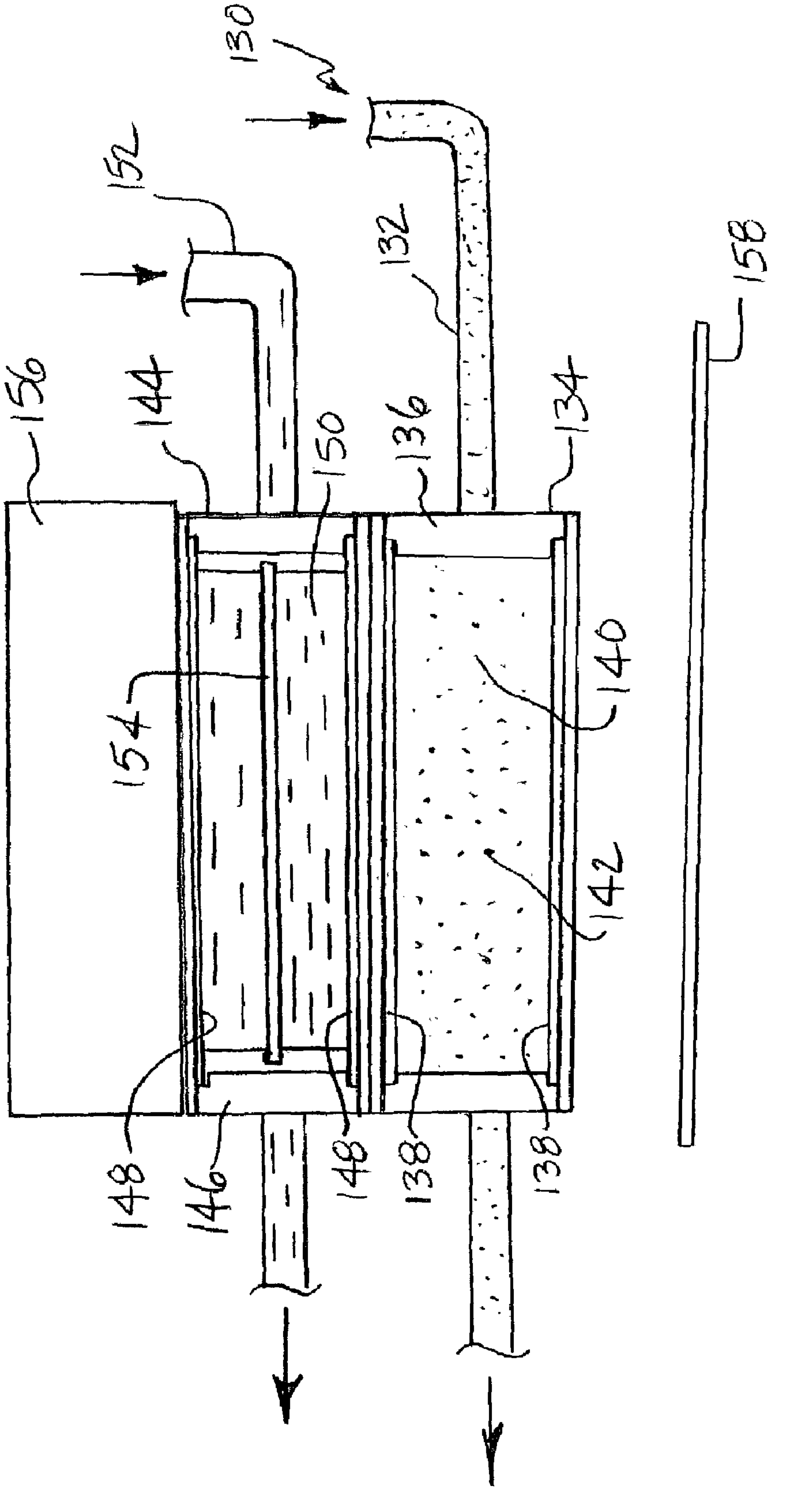
FIG. 7A is a schematic view of a portion of an alternative filtering system according to the present invention.

FIG. 7A illustrates an alternative filtering system according to the present invention. The filtering system includes a shutter system 130 having a circulating system 132 for directing a liquid coolant to a first filter assembly 134. The first filter assembly 134 includes a filter body 136 and ultraviolet transmissive panes 138 defining a chamber 140 for receiving the circulating liquid coolant. The shutter system 130, similar to shutter system 104, includes a plurality of opaque particles 142 in suspension in the liquid coolant for circulation through the chamber 140 of the first filter assembly 134. The shutter system 130, also similar to shutter system 104, includes a trap system (not shown) having an electromagnet for removing the suspended particles 142 from circulation to the first filter assembly 134 when additional filtering of the radiant energy beam is not needed.

The filtering system of FIG. 7A further includes a second filter assembly 144 positioned adjacent the first filter assembly 134. The second filter assembly 144 includes a filter body 146 and opposite panes 148 defining a chamber 150 in a similar manner to the first filter assembly 134. The second filter assembly 144 is connected to a circulation system 152 for receipt of a liquid coolant in the chamber 150. A solid filter 154, similar to solid filter 64, is positioned within the chamber 150 of the second filter assembly 144. The use of separate filter assemblies 134, 144 connected to separate circulating systems 132, 152 prevents contact between the opaque particles 142 of the shutter system 130 and the solid filter 154. The separation of the solid filter 154 from the circulating particles 142 serves to prolong the life of the solid filter 154 by preventing abrasion that could otherwise occur if the circulating particles 142 and solid filter 154 contained in the same chamber.

The second filter assembly 144 is positioned between the lamp/reflector assembly 156 and the first filter assembly 134. In this manner, the radiant energy beam generated by the lamp/reflector assembly 156 is directed first through the second filter assembly 144 and then through the first filter assembly 134 of the shutter system 130 before being directed to the substrate 158.

As previously discussed, this invention relates to curing materials on various substrates. The limited-heat curing of the present invention has application beyond the graphics industry to any application where heat generated during curing would have a deleterious effect on either the equipment in which the curing device is mounted, or on the substrate that is being cured. Examples may be found in the floor covering and in the electronics related industries for curing of CD and DVD discs having UV curable material.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the recitation of the appended claims.

What is claimed is:

1. An apparatus for curing photosensitive ink or coating materials applied to a substrate within a printing press or the like, the apparatus positioned directly adjacent and in a closely spaced relationship with the substrate having the photosensitive ink or coating thereon, the apparatus comprising:

a high intensity lamp generating radiant energy containing ultraviolet and infrared radiation, as well as visible light;

a filter body positioned adjacent the lamp and receiving the radiant energy generated by the lamp, the filter body defining an open interior;

first and second panes located on opposite sides of the filter body to enclose the open interior of the filter body and forming a sealed chamber, each of the panes being transmissive to ultraviolet radiation;

an inlet and an outlet communicating with the chamber, the inlet and outlet adapted for connection to a fluid circulation system for circulating a coolant through the open interior of the chamber; and a solid filter positioned in the chamber between and spaced from the first and second panes, the solid filter and the liquid filled chamber being transmissive to ultraviolet radiation and capable of filtering and absorbing substantially all undesirable radiation from the lamp that is directed into the chamber and toward the substrate above approximately 700 nm, the fluid circulation through the chamber and around the solid filter cooling the solid filter such that the radiant energy directed through the chamber is cooled to provide for ultraviolet radiation curing by rapid polymerization of the photosensitive materials, with limited heating of the substrate, photosensitive materials and adjacent structures due to the radiant energy produced by the lamp and the absorption of radiation by the solid filter material and filter body.

2. The apparatus according to claim 1, further comprising retainer plates secured to opposite sides of the filter body, each of the first and second panes positioned between the body and one of the retainer plates.

3. The apparatus according to claim 2 wherein recesses are formed in either the filter body or the retainer plates and wherein the panes are received in the recesses.

4. The apparatus according to claim 2 wherein the retainer plates are secured to the filter body by fasteners.

5. The apparatus according to claim 1, wherein filter body includes side walls and end walls and wherein the inlet and outlet communicate with the chamber through opposite end walls adjacent the same side wall.

6. The apparatus according to claim 1 further comprising a reflector having parabolic curved surface, the reflector positioned adjacent the lamp for redirecting a portion of the radiant energy generated by the lamp to form a focused beam of radiant energy directed towards the solid filter.

7. The apparatus according to claim 6, wherein the reflector defines a hollow interior for receiving and circulating a fluid coolant through the reflector.

8. The apparatus according to claim 6 further comprising a plurality of connectors each having a first end portion connected to the filter body and an opposite second end portion connected to the reflector for securing the reflector directly adjacent the filter body.

9. An apparatus for printing comprising:

at least one print stand capable of applying a photosensitive materials, selected from the group consisting of inks and coatings, to a substrate;

a high intensity lamp positioned adjacent the print stand, the lamp generating radiant energy containing ultraviolet radiation for rapid curing by substantially complete polymerization of the photosensitive material applied to the substrate; and a filter assembly positioned in a closely spaced relationship between the lamp and the substrate to receive radiant energy directed toward the substrate, the filter assembly including a body defining an open interior and opposite panes enclosing the interior of the body to form a sealed chamber, an inlet and an outlet communicating with the chamber for directing a fluid through the open interior of the sealed chamber, and at least one solid filter positioned within the open interior of the chamber and spaced from the opposing panes, each of the panes, the liquid filled chamber and the solid filters being transmissive to ultraviolet radiation and the panes, the solid filter and the liquid filled chamber substantially absorbing all radiation from the lamp that is directed into the chamber above approximately 700 nm, the light from the lamp being directed through the chamber and onto the substrate positioned in a closely spaced relationship with the filter assembly, the fluid circulation through the chamber and around the solid filter cooling the solid filter such that the radiant energy directed through the chamber is cooled to provide ultraviolet radiation curing while substantially limiting heat curing of the photosensitive material on the substrate and the heating of the print stand portions adjacent the lamp and filter assembly due to the heat producing radiant energy from the lamp and the absorption of heat by the filter and filter body.

10. The apparatus according to claim 9, further comprising a reflector having a parabolic surface positioned adjacent the lamp for redirecting a portion of the radiant energy generated by the lamp to form a focused beam of radiant energy directed toward the solid filter.

11. The apparatus according to claim 10, wherein the filter assembly further comprises retainer plates secured to opposite sides of the body, each of the panes positioned between the body and one of the retainer plates.

12. The apparatus according to claim 11, wherein recesses are formed in either the body of the filter assembly or the retainer plates and wherein the panes are received in the recesses.

13. The apparatus according to claim 11, wherein each of the retainer plates is secured to the body of the filter assembly by a plurality of fasteners.

14. The apparatus according to claim 1, wherein the operating power range of the lamp is substantially between 5000 to 25,000 watts.

15. The apparatus according to claim 9, wherein the lamp comprises a medium pressure, mercury vapor lamp.

16. The apparatus according to claim 9, further comprising a liquid cooled reflector surrounding the lamp and directing radiant energy emitted by the lamp as a focused beam through the filter assembly.

17. The apparatus according to claim 9, wherein the lamp has an operating power substantially in the range of 5000 to 25,000 watts.

* * * * *